United States Patent
Livingston

(10) Patent No.: US 10,614,152 B2
(45) Date of Patent: Apr. 7, 2020

(54) EXPOSING FORMATTING PROPERTIES OF CONTENT FOR ACCESSIBILITY

(71) Applicant: Microsoft Technology Licensing, LLC, Redmond, WA (US)

(72) Inventor: Elise Livingston, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 15/292,430

(22) Filed: Oct. 13, 2016

(65) Prior Publication Data

US 2018/0107631 A1    Apr. 19, 2018

(51) Int. Cl.
| G06F 17/00 | (2019.01) |
| G06F 17/21 | (2006.01) |
| G06F 17/24 | (2006.01) |

(52) U.S. Cl.
CPC ............ *G06F 17/211* (2013.01); *G06F 17/24* (2013.01)

(58) Field of Classification Search
CPC .. G06F 17/212; G06F 17/211; G06F 17/2241; G06F 17/24; G06F 3/04812; G06F 3/0481; G06F 16/9577; G06F 17/2264; G06F 17/2247; G06F 17/30905; G06F 17/214; G06F 17/2217; H04L 67/2823; H04L 16/9577; H04L 67/28; H04L 67/2828; H04L 67/303
USPC ........................................................ 715/249
See application file for complete search history.

(56) References Cited

U.S. PATENT DOCUMENTS

| 6,159,013 | A | 12/2000 | Parienti |
| 7,103,551 | B2 | 9/2006 | King et al. |
| 8,086,996 | B2 | 12/2011 | Bhogal et al. |
| 8,194,075 | B2 | 6/2012 | Breeds et al. |
| 8,479,092 | B1 * | 7/2013 | Pandey ................. G06F 17/211 715/243 |
| 8,812,946 | B1 * | 8/2014 | Kopylov ............. G06F 17/2247 715/202 |
| 8,826,137 | B2 | 9/2014 | Hofstader et al. |
| 8,873,931 | B2 | 10/2014 | Jung et al. |
| 8,910,041 | B1 * | 12/2014 | Buryak ................. G06F 17/214 715/269 |

(Continued)

OTHER PUBLICATIONS

Zajicek, et al., "A Web Navigation Tool for the Blind", In Proceedings of the third international ACM conference on Assistive technologies, Jan. 1, 1998, 5 pages.

(Continued)

*Primary Examiner* — Jason T Edwards

(57) ABSTRACT

Aspects of the present disclosure relate to systems and methods for providing access to formatting information of authored content within an application. In one aspect, one or more of a plurality of standard formatting properties of the authored content within an application may be translated to one or more corresponding platform specific formatting properties. A request for formatting information of at least some of the authored content within the application may be received. The formatting information may be associated with the one or more corresponding platform specific formatting properties. The requested formatting information of at least some of the authored content within the application may be provided by exposing the one or more corresponding platform specific formatting properties to a screen reader.

20 Claims, 8 Drawing Sheets

(56) References Cited

U.S. PATENT DOCUMENTS

| | | | |
|---|---|---|---|
| 2005/0120308 A1 | 6/2005 | Gibson et al. | |
| 2005/0204295 A1 | 9/2005 | Voorhees et al. | |
| 2007/0061349 A1* | 3/2007 | Morgan | G06T 17/005 |
| 2007/0186152 A1* | 8/2007 | Gurcan | G06F 17/211 |
| | | | 715/209 |
| 2008/0139191 A1* | 6/2008 | Melnyk | H04L 67/2823 |
| | | | 455/419 |
| 2010/0174981 A1* | 7/2010 | Jiang | G06F 8/51 |
| | | | 715/236 |
| 2011/0258535 A1* | 10/2011 | Adler, III | G06F 17/214 |
| | | | 715/235 |
| 2013/0104029 A1 | 4/2013 | Hendry et al. | |
| 2013/0179771 A1* | 7/2013 | Dent | G06F 17/211 |
| | | | 715/234 |
| 2013/0191389 A1* | 7/2013 | Lazarevic | G06K 9/00469 |
| | | | 707/737 |
| 2013/0191728 A1* | 7/2013 | McKinney | G06F 17/211 |
| | | | 715/243 |
| 2013/0194402 A1 | 8/2013 | Amedi et al. | |
| 2014/0063070 A1* | 3/2014 | Leventhal | G06F 3/04812 |
| | | | 345/660 |
| 2015/0234798 A1* | 8/2015 | Mocanu | G06F 17/2247 |
| | | | 715/236 |
| 2015/0248887 A1 | 9/2015 | Wlodkowski et al. | |
| 2015/0269125 A1* | 9/2015 | Desai | G06F 17/212 |
| | | | 715/752 |
| 2015/0363365 A1 | 12/2015 | Campbell | |

OTHER PUBLICATIONS

"InDesign Help / Work with frames and objects", Published on: Dec. 9, 2013 Available at: https://helpx.adobe.com/indesign/using/frames-objects.html.

* cited by examiner

300A

| Formatting Properties 310A | Examples 320A |
|---|---|
| Fill Type | Color, gradient, pattern, etc. |
| Fill presets | Light gradient, papyrus texture, zig zag pattern, etc. |
| Effect Type | Reflection, shadow, glow, etc. |
| Basic line properties | Color, width, arrows |
| Size & Rotation | Height, width, degrees of rotation |
| Position | Horizontal position, vertical position |
| Gradient & Color Types | Linear gradient, radial gradient, color of gradient stops |
| Line dash types | Solid, round dot, square dot, etc. |
| 3D rotation presets | Isometric left down, perspective left, etc. |
| Text Transform presets | Arch up, arch down, fade left, etc. |
| Effect presets | Offset bottom shadow, half reflection, etc. |
| Line Type | No line, solid line, gradient line, etc. |

| Formatting Properties 310B | Examples 320B |
|---|---|
| Gradient directions | Linear diagonal – top left to bottom right, from center, etc. |
| Picture & texture fill properties | Transparency, offset, etc. |
| Detailed line properties | Transparency, compound type |
| Detailed effect properties | Color, transparency, size, blur, bevel material, etc. |
| Custom 3D rotation properties | X rotation, Y rotation |
| Detailed size properties | Scale height, locked aspect ratio, resolution, etc. |
| Advanced gradient properties | Angle, # gradient stops, position of gradient stops, etc. |
| Advanced line properties | Cap type, joint type, arrow size, etc. |
| Advanced bevel properties | Lighting angle |

FIG. 3B

EXPOSING FORMATTING PROPERTIES OF CONTENT FOR ACCESSIBILITY

BACKGROUND

Many applications include content with rich formatting properties such as color, outlines, shadow, glow, 3D effects, and the like. People with vision impairments often are left out of experiencing rich formatting properties of content. Current techniques for providing an experience of consuming content for people with vision impairments include utilizing a screen reader to access properties such as shape, color, and text. However, with these techniques a person with vision impairments is left out of fully experiencing and consuming content. In this regard, current techniques for providing an experience of consuming content for people with vision impairments make it difficult for people with vision impairments to clearly and accurately consume content and/or follow along in content with their peers. In turn, current techniques for providing an experience of consuming content for people with vision impairments are inefficient and inadequate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for providing access to formatting information of authored content within an application. In one aspect, one or more of a plurality of standard formatting properties of the authored content within an application may be translated to one or more corresponding platform specific formatting properties. A request for formatting information of at least some of the authored content within the application may be received. The formatting information may be associated with the one or more corresponding platform specific formatting properties. The requested formatting information of at least some of the authored content within the application may be provided by exposing the one or more corresponding platform specific formatting properties to a screen reader.

In another aspect, a hierarchical structure of a plurality of standard formatting properties of content associated with an application may be generated. One or more of the plurality of standard formatting properties may be translated to one or more corresponding platform specific formatting properties. The one or more corresponding platform specific formatting properties may be exposed in the hierarchical structure for access by a screen reader.

In yet another aspect, an application comprises a file in a user interface through which to present at least one tool for authoring of content. The application may further comprise at least one tool through which to, in response to receiving an indication of interest made with respect to the at least one tool, facilitate authoring of content within the file. The application may further comprise authored content within the file in the user interface through which to, in response to receiving a request for formatting information of at least some of the authored content within the file, expose a plurality of formatting properties of the authored content to a screen reader. The plurality of formatting properties may include at least layout properties.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 3A illustrates a table of exemplary formatting properties, according to an example aspect.

FIG. 3B illustrates another table of exemplary formatting properties, according to an example aspect.

DETAILED DESCRIPTION

Figure 1:
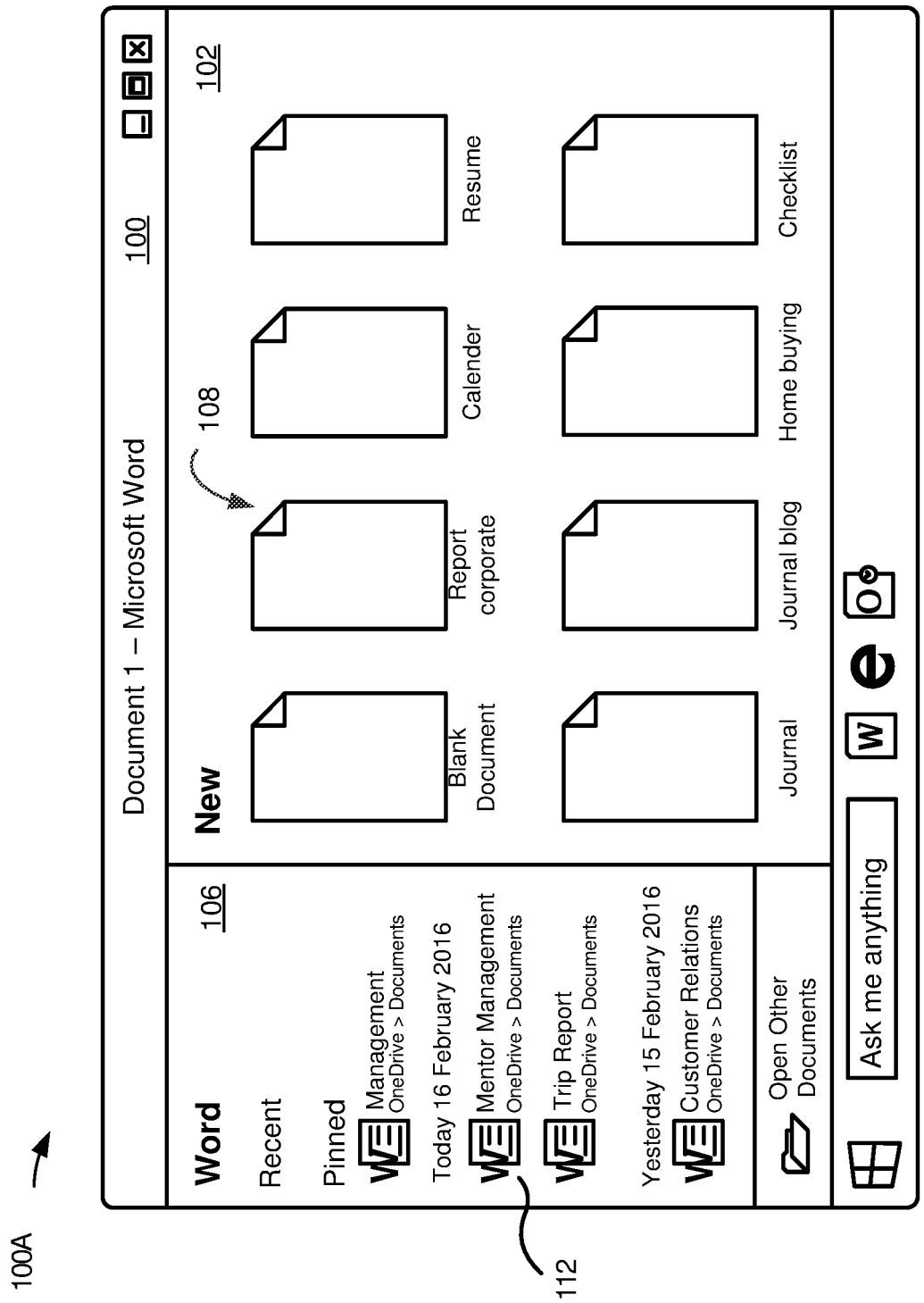
FIG. 1 illustrates an example view of a word processing application, according to an example aspect.

Aspects of the disclosure are generally directed to providing access to formatting information of authored content within an application for users with visual (e.g., vision) impairments. For example, a plurality of formatting properties of content within an application may be exposed to a screen reader such that formatting information of the content is read to a user with visual impairments using the screen reader. In this regard, users of the application who have visual impairments may fully consume content that they otherwise would not be able to consume. In some cases, exposing a plurality of formatting properties of content to a screen reader may assist a user with visual impairments in authoring content within an application. For example, while a user with visual impairments is creating a PowerPoint presentation, exposing a plurality of formatting properties to a screen reader may assist the user with placing content (e.g., objects, tables, graphs, text) in the proper location within a slide.

As discussed above, people with vision impairments often are left out of experiencing rich formatting properties of content. Current techniques for providing an experience of consuming content for people with vision impairments include utilizing a screen reader to access properties such as shape, color, and text. However, with these techniques a person with vision impairments is left out of fully experiencing and consuming content. In this regard, current techniques for providing an experience of consuming content for people with vision impairments make it difficult for people with vision impairments to clearly and accurately consume content and/or follow along in content with their peers. In turn, current techniques for providing an experience of consuming content for people with vision impairments are inefficient and inadequate.

Accordingly, aspects described herein include providing access to formatting information of authored content within an application for users with visual impairments. In one example, a hierarchical structure of a plurality of formatting properties of content associated with an application may be generated. The hierarchical structure of the plurality of formatting properties may be organized such that each type of a formatting property has sub-categories of formatting properties. In this regard, a user with visual impairments may request additional formatting information when an initial formatting property is read to the user. In some cases, the plurality of formatting properties of content associated with an application generated in the hierarchical structure may include standard formatting properties. The standard formatting properties may include formatting properties that are accessible across all computing platforms (e.g., all operating systems running on any type of hardware). In this regard, one or more of the plurality of standard formatting properties may be translated to one or more corresponding platform specific formatting properties. In turn, a screen reader may have access to the plurality of formatting properties of content associated with an application regardless of what platform the application is running on. The one or more corresponding platform specific formatting properties may be exposed in the hierarchical structure for access by a screen reader. As such, a technical effect that may be appreciated is that by providing access to formatting properties of authored content within an application across all platforms, processor load may be reduced and memory may be conserved.

Further aspects described herein include receiving a request for formatting information of at least some of the authored content within the application. For example, a user with visual impairments may use a screen reader to consume content previously authored within an application. In this case, the user may request formatting information of some of and/or all of the content within a file, for example. In another example, a user with visual impairments may use a screen reader as they are authoring content within an application. For example, as a user with visual impairments is creating content (e.g., text, objects, graphs, tables, and the like), the user may request formatting information such as layout information so that they know where within a file, for example, the content is located and/or where the content is located relative to other content within the file. In some cases, the formatting information may be associated with the one or more corresponding platform specific formatting properties. For example, a platform specific formatting property may include a fill type. The formatting information associated with the fill type formatting property may include a color such as blue. In some examples, the formatting properties may include fill types, fill presets, effect types, effect presets, line types, basic line properties, size, rotation, position, gradient and color types, line dash types, 3D rotation presets, text transform presets, gradient directions, picture and texture fill properties, detailed line properties, detailed effect properties, custom 3D rotation properties, detailed size properties, advanced gradient properties, advanced line properties, and advanced bevel properties, among others. The requested formatting information of at least some of the authored content within the application may be provided by exposing the one or more corresponding platform specific formatting properties to a screen reader. In this regard, a person with vision impairments can view content within an application clearly and accurately and have the same experience that a person without vision impairments can have while viewing and/or authoring content within a file and/or application. In turn, a technical effect that may be appreciated is that exposing a plurality of formatting properties such that formatting information of content within an application can be read by a screen reader facilitates a compelling visual and functional experience to allow a user with visual disabilities/impairments to efficiently interact with the user interface, consume content in applications, and author content in applications.

Referring now to the drawings, in which like numerals represent like elements through the several figures, aspects of the present disclosure and the exemplary operating environment will be described. With reference to FIG. 1, one view 100A of a word processing application 100 is illustrated. While the word processing application 100 is illustrated in FIG. 1, it is appreciated that any application including content such as documents, images, templates, and the like, such as word processing applications, spreadsheet applications, electronic slide presentation applications, email applications, chat applications, voice applications, and the like may be utilized with the present disclosure.

Figure 5:
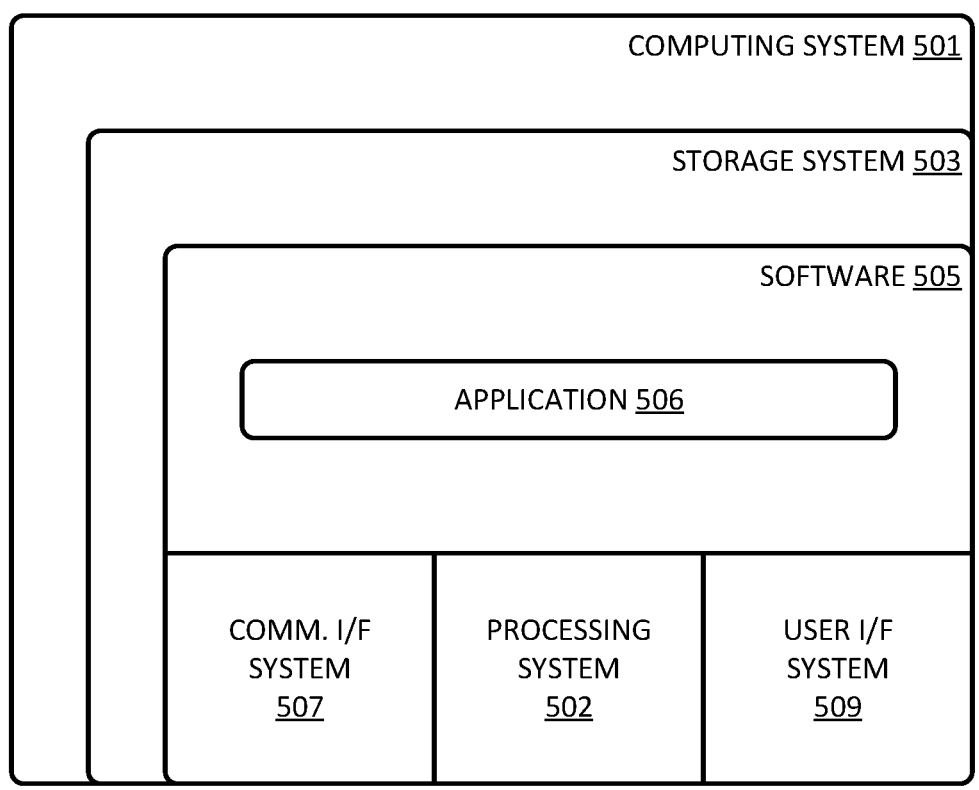
FIG. 5 illustrates a computing system suitable for implementing the enhanced content accessibility technology disclosed herein, including any of the environments, architectures, elements, processes, user interfaces, and operational scenarios and sequences illustrated in the Figures and discussed below in the Technical Disclosure.

In aspects, the word processing application 100 may be implemented on a client computing device (e.g., such as the computing device illustrated in FIG. 5). In a basic configuration, the client computing device is a handheld computer having both input elements and output elements. The client computing device may be any suitable computing device for implementing the word processing application 100 for providing access to formatting information of authored content within an application for users with visual (e.g., vision) impairments. For example, the client computing device may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device for implementing the word processing application 100 for providing access to formatting information of authored content within an application for users with visual (e.g., vision) impairments may be utilized.

In aspects, the word processing application 100 may be implemented on a server computing device (e.g., such as the computing device illustrated in FIG. 5). The server computing device may provide data to and from a client computing device through a network. In aspects, the word processing application 100 may be implemented on more than one server computing device, such as a plurality of server computing devices. As discussed above, the server computing device may provide data to and from a client computing device through a network. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In this regard, content of an application may be displayed on a user interface of a client computing device.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In aspects, the view 100A of the word processing application 100 is one example of a view a user may encounter when interacting with the word processing application 100. The view 100A of the word processing application 100 may include a file 102, a contextual panel 106, and content 108. The various components may be implemented using hardware, software, or a combination of hardware and software. In the example illustrated in FIG. 1, the file 102 is a word document. In some examples, the file 102 may include a word document, a spreadsheet, an electronic slide presentation, an email, a chat conversation, and the like. As illustrated in FIG. 1, the file 102 may display content 108. In one example, the content 108 is authored by a user with a visual impairment. The contextual panel 106 may include recent files 112 associated with the word processing application 100. The content 108 may include a plurality of various types of content such as text, objects, images, graphs, tables and/or any other elements.

As discussed above, access may be provided to formatting information of authored content within an application for users with visual impairments. In this regard, a plurality of formatting properties, as discussed herein, of the content 108 may be exposed to a screen reader. A screen reader is a software application suitable to convert visual content into speech such that a user may listen to the visual content. The screen reader may include any screen reader configured to read and/or consume the plurality of formatting properties of the content 108. In some cases, the plurality of formatting properties of the content 108 may be exposed to a screen reader when a request for formatting information of at least some of the content 108 within the word processing application 100 is received via the screen reader. For example, a user with visual impairments may use a screen reader to consume the content 108 displayed in the file 102 associated with the word processing application 100. In this case, the user may request formatting information of some of and/or all of the content 108 within the file 102 using a screen reader. In another example, the screen reader may read and/or consume at least some of the content 108 (e.g., at least some of the formatting information of the content 108) by default as a user tabs through the content 108, for example. In some examples, the formatting properties of the content 108 exposed to a screen reader by default may include shape, color, and text. In other examples, the formatting properties of the content 108 exposed to a screen reader in response to receiving a request for formatting information using the screen reader may include at least fill types, fill presets, effect types, effect presets, line types, basic line properties, size, rotation, position, gradient and color types, line dash types, 3D rotation presets, text transform presets, gradient directions, picture and texture fill properties, detailed line properties, detailed effect properties, custom 3D rotation properties, detailed size properties, advanced gradient properties, advanced line properties, and advanced bevel properties.

In another example, the word processing application 100 may be implemented as a user interface component. In one case, the user interface component may be a touchable user interface that is capable of receiving input via contact with a screen of the client computing device, thereby functioning as both an input device and an output device. For example, content may be displayed, or output, on the screen of the client computing device and input may be received by contacting the screen using a stylus or by direct physical contact of a user, e.g., touching the screen. Contact may include, for instance, tapping the screen, using gestures such as swiping or pinching the screen, sketching on the screen, etc.

In another case, the user interface component may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device, thereby functioning as both an input device and an output device. For example, content may be displayed, or output, on the screen of the client computing device and input may be received by contacting the screen using a cursor, for example. In this regard, contact may include, for example, placing a cursor on the non-touchable user interface using a device such as a mouse.

Figure 2A:
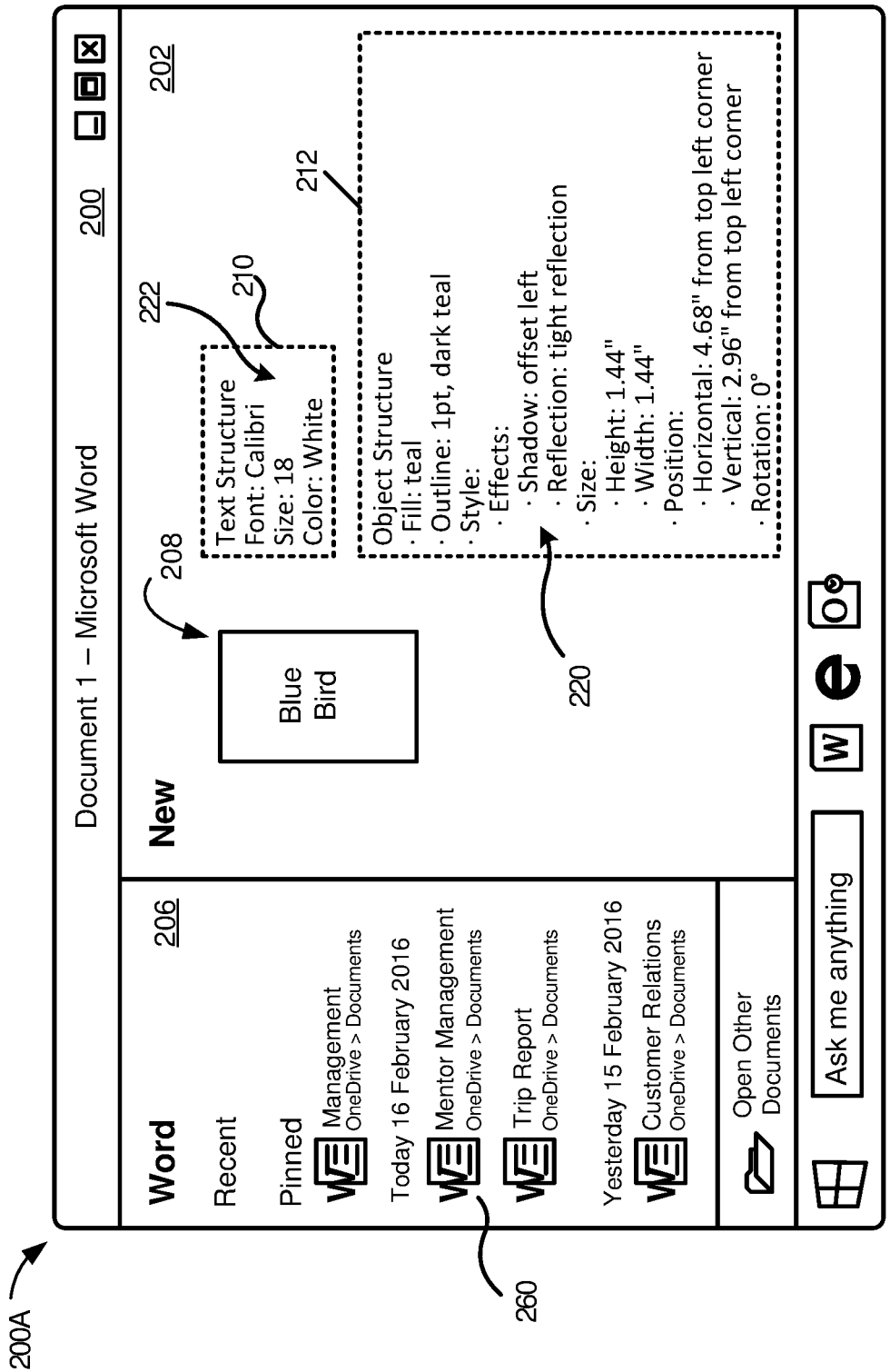
FIG. 2A illustrates one view in a progression of views of a word processing application, according to an example aspect.

Referring now to FIG. 2A, one view 200A in a progression of views of a word processing application 200 is illustrated. As discussed above, while the word processing application 200 is illustrated in FIG. 2A, it is appreciated that any application including content such as documents, images, templates, and the like, such as word processing applications, spreadsheet applications, electronic slide presentation applications, email applications, chat applications, voice applications, and the like may be utilized with the present disclosure. The view 200A of the word processing application 200 is another example of a view a user may encounter when interacting with the word processing application 200.

In one example, similar to the view 100A of the word processing application 100, the view 200A may include a file 202, a contextual panel 206, and content 208. The various components may be implemented using hardware, software, or a combination of hardware and software. In the example illustrated in FIG. 2A, the file 202 is a word document. In some examples, the file 202 may include a word document, a spreadsheet, an electronic slide presentation, an email, a chat conversation, and the like. The contextual panel 206 may include recent files 260 associated with the word processing application 200. In the example illustrated in FIG. 2A, the content 208 displayed within the file 202 includes a rectangular object with the text, "Blue Bird". In one example, the content 208 may include Microsoft Office® art, shapes, and objects. As discussed above, a hierarchical structure of a plurality of formatting properties of content associated with an application may be generated. In this regard, the content 208 associated with the word processing application 200 may include hierarchical structures 210 and 212. The hierarchical structure 210 may include a text structure for the plurality of formatting properties 222 of the text, "Blue Bird". In the example illustrated in FIG. 2A, the plurality of formatting properties 222 include font, size, and color of the text, "Blue Bird". In some examples, the plurality of formatting properties 222 may include formatting information. In this regard, the formatting property "Font" includes the formatting information, "Calibri", the formatting property "Size" includes the formatting information "18", and the formatting property "Color" includes the formatting information "White". As such, when a user with vision impairments uses a screen reader to consume the content 208, the plurality of formatting properties 222 may be exposed to the screen reader such that the user may consume the formatting information associated with the plurality of formatting properties 222. For example, in one case, when a user requests formatting information of the content 208 using a screen reader, the user may hear, "has text blue bird, font is Calibri, size is 18, color is white."

As discussed above, the content 208 associated with the word processing application 200 may include hierarchical structure 212. The hierarchical structure 212 may include an object structure for the plurality of formatting properties 220 of the object 208 (e.g., content 208). In the example illustrated in FIG. 2A, the plurality of formatting properties 220 include fill type, basic line properties, effect types, effect presets, size, position, and rotation. The hierarchical structure 212 of the plurality of formatting properties 220 may be organized such that at least some of each type of a formatting property 220 have sub-categories of formatting properties. For example, as illustrated in FIG. 2A, the formatting property "effect types" has a sub-category of formatting property "effect presets". In this example, the formatting property "effect types" includes shadow and reflection. In this regard, the effect preset of the effect type "shadow" is "offset left" and the effect preset of the effect type "reflection" is "tight reflection". In this regard, a user with visual impairments may request additional formatting information when an initial formatting property is read to the user. In another example, the formatting property "size" has a sub-category of formatting properties "height" and "width". In one example, as illustrated in FIG. 2A, the formatting information associated with the formatting property "height" is 1.44 inches. In another example, the formatting information associated with the formatting property "width" is 1.44 inches. In further examples, the formatting property "position" has a sub-category of formatting properties "horizontal" and "vertical". In one example, as illustrated in FIG. 2A, the formatting information associated with the formatting property "horizontal" is 4.68 inches from top left corner. In another example, the formatting information associated with the formatting property "vertical" is 2.96 inches from top left corner. In yet another example, the formatting property "rotation" includes formatting information "0°". As such, when a user with vision impairments uses a screen reader to consume the content 208, the plurality of formatting properties 220 may be exposed to the screen reader such that the user may consume the formatting information associated with the plurality of formatting properties 220.

It is appreciated that while FIG. 2A illustrates hierarchical structures 210, 212 and formatting properties 220, 222 the discussion of hierarchical structures 210, 212 and formatting properties 220, 222 is exemplary only and should not be considered as limiting. Any suitable number and/or type of hierarchical structures and formatting properties may be utilized to provide access to formatting information of content within an application for users with visual (e.g., vision) impairments. Furthermore, while the present disclosure discusses the word processing application 200, file 202, and content 208, this is only exemplary and should not be considered limiting. Any number of applications, files, and/or content may be utilized in conjunction with the present disclosure.

Figure 2B:
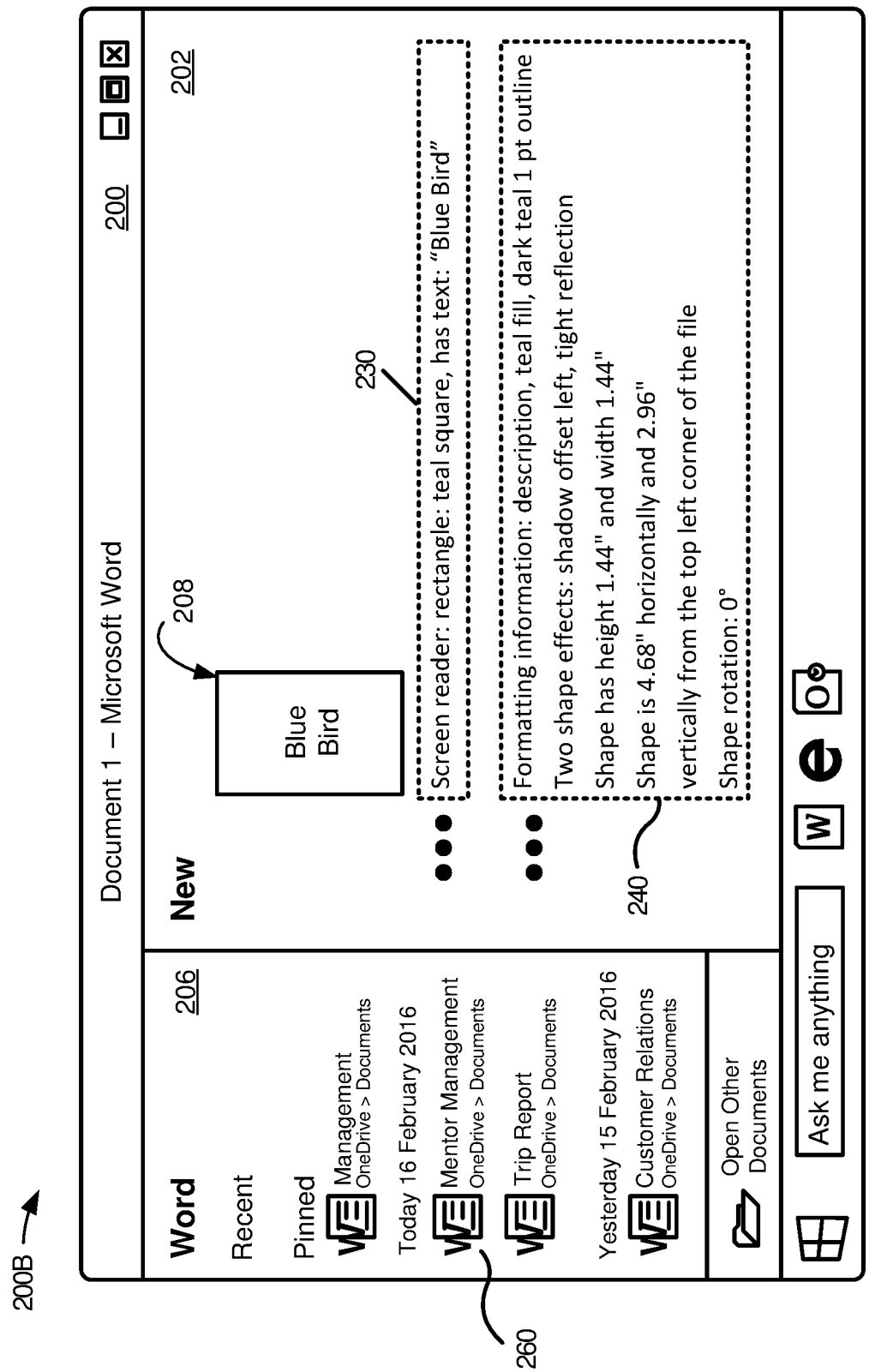
FIG. 2B illustrates another view in the progression of views of the word processing application of FIG. 2A, according to an example aspect.

Referring now to FIG. 2B, another view 200B in a progression of views of the word processing application 200 is illustrated. The view 200B of the word processing application 200 is another example of a view a user may encounter when interacting with the word processing application 200. In one example, similar to the view 200A of the word processing application 200, the view 200B may include the file 202, the contextual panel 206, and content 208. The various components may be implemented using hardware, software, or a combination of hardware and software. In the example illustrated in FIG. 2B, the file 202 is a word document. In some examples, the file 202 may include a word document, a spreadsheet, an electronic slide presentation, an email, a chat conversation, and the like. The contextual panel 206 may include recent files 260 associated with the word processing application 200. In the example illustrated in FIG. 2B, the content 208 displayed within the file 202 includes a rectangular object with the text, "Blue Bird". In one example, the content 208 may include Microsoft Office® art, shapes, and objects.

As discussed above, when a user with vision impairments uses a screen reader to consume the content 208, a plurality of formatting properties (e.g., formatting properties 220, 222 of FIG. 2A) may be exposed to the screen reader such that the user may consume the formatting information associated with the plurality of formatting properties (e.g., formatting properties 220, 222 of FIG. 2A). In this regard, as illustrated in FIG. 2B, when a user requests formatting information of the content 208 using a screen reader, the requested formatting information associated with the formatting properties may be provided to the screen reader. In one example, a user may request formatting information 230 associated with the text of the content 208. In one example, the formatting information 230 is associated with the formatting properties 222 of FIG. 2A. In this example, when the user requests formatting information 230, the user may hear, "rectangle: teal square, has text blue bird". In some examples, the formatting information of the content 208 requested may be based on settings associated with the screen reader. For example, a user may set the settings of the screen reader to consume the formatting information of interest to the user. In this regard, any number of formatting properties of the content 208 may be exposed to the screen reader.

In another example, a user may request formatting information 240 associated with the content 208. In one example, the formatting information 240 is associated with the formatting properties 220 of FIG. 2A. In this example, when the user requests formatting information 240, the user may hear, "description, teal fill, dark teal, 1 pt outline. Two shape effects: shadow offset left, tight reflection. Shape has height 1.44 inches and width 1.44 inches. Shape is 4.68 inches horizontally and 2.96 inches vertically from the top left corner of the file. Shape rotation: 0 degrees". In this regard, a person with vision impairments can view (e.g., via listening to a plurality of formatting properties) the content 208 within the application 200 clearly and accurately and have the same experience that a person without vision impairments can have while viewing and/or authoring content within a file and/or application.

It is appreciated that while FIG. 2B illustrates formatting information 230, 240, the discussion of formatting information 230, 240 is exemplary only and should not be considered as limiting. Any suitable amount and/or type of formatting information may be utilized to facilitate consumption of content for users with visual (e.g., vision) impairments.

Figure 2C:
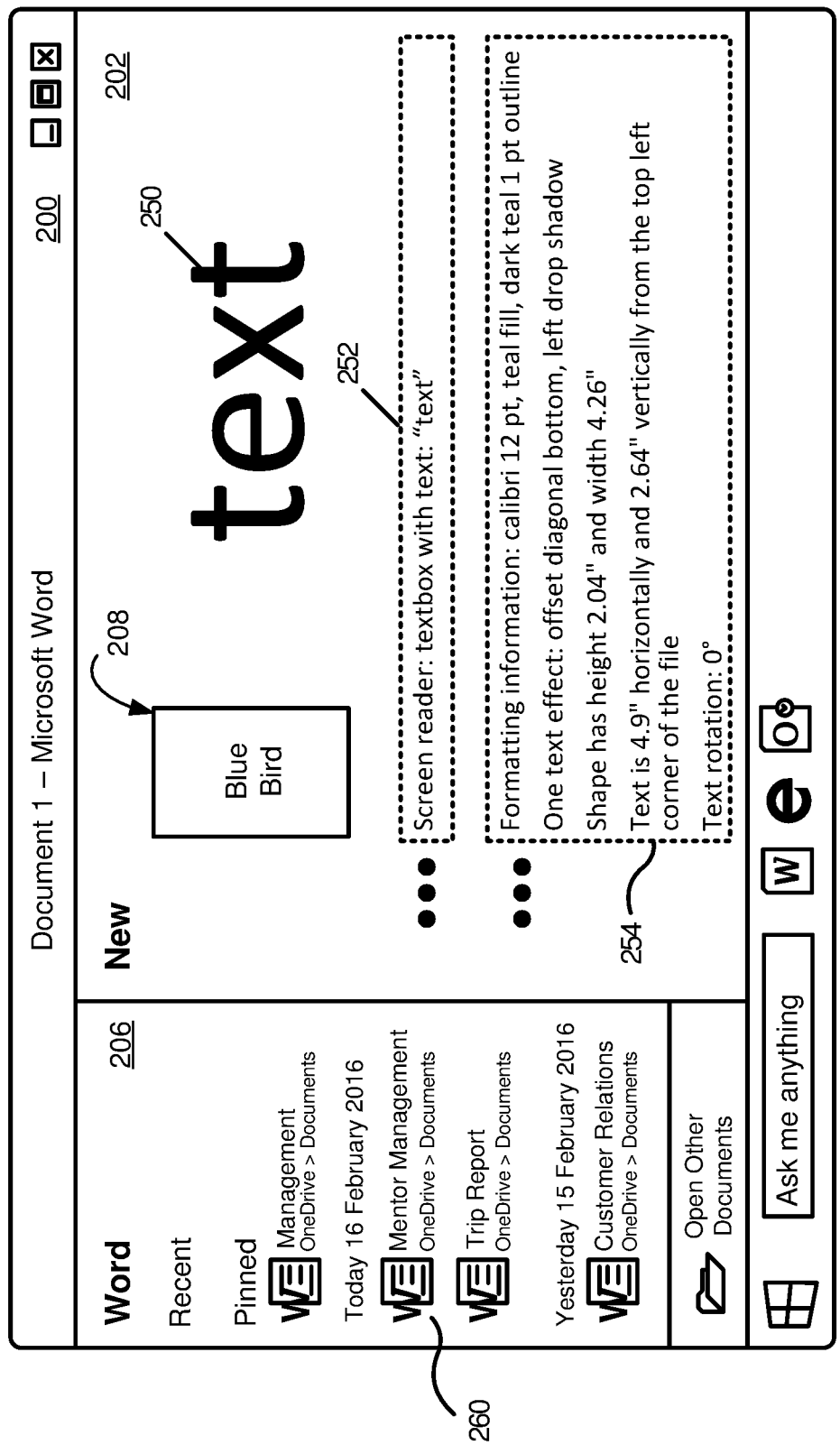
FIG. 2C illustrates another view in the progression of views of the word processing application of FIG. 2A, according to an example aspect.

Referring now to FIG. 2C, another view 200C in a progression of views of the word processing application 200 is illustrated. The view 200C of the word processing application 200 is another example of a view a user may encounter when interacting with the word processing application 200. In one example, the view 200C may include the file 202, the contextual panel 206, content 208 and additional content 250. The various components may be implemented using hardware, software, or a combination of hardware and software. In the example illustrated in FIG. 2C, the file 202 is a word document. In some examples, the file 202 may include a word document, a spreadsheet, an electronic slide presentation, an email, a chat conversation, and the like. The contextual panel 206 may include recent files 260 associated with the word processing application 200. In the example illustrated in FIG. 2C, the content 208 displayed within the file 202 includes a rectangular object with the text, "Blue Bird". The additional content 250 includes a textbox with the text, "text".

As discussed above, a user with visual impairments may use a screen reader as they are authoring content within an application. For example, as a user with visual impairments is creating content (e.g., text, objects, graphs, tables, and the like), the user may request formatting information such as layout information so that they know where within a file, for example, the content is located and/or where the content is located relative to other content within the file. In this regard, as illustrated in FIG. 2C, a user may author additional content 250 in addition to previously authored content 208. As such, in one example, as a user is authoring additional content 250, the user may request formatting information 252. In this example, when the user requests formatting information 252, the user may hear, "textbox with text, text". In another example, a user may request formatting information 254. In this example, when the user requests formatting information 254, the user may hear, "Calibri 12 pt, teal fill, dark teal 1 pt outline. One text effect: offset diagonal bottom, left drop shadow. Shape has height 2.04 inches and width 4.26 inches. Text is 4.9 inches horizontally and 2.64 inches vertically from the top left corner of the file. Text rotation: 0 degrees". In this regard, a user with visual impairments may work independently while feeling confident about authoring content within an application.

It is appreciated that while FIG. 2C illustrates formatting information 252, 254, the discussion of formatting information 252, 254 is exemplary only and should not be considered as limiting. Any suitable amount and/or type of formatting information may be utilized to facilitate consumption and/or authoring of content for users with visual (e.g., vision) impairments.

Referring now to FIG. 3A, a table 300A of exemplary formatting properties is illustrated. The table 300A includes formatting properties 310A and formatting property examples 320A (e.g., sub-categories and/or formatting information of formatting properties 310A). The formatting properties 310A include fill types, fill presets, effect types, effect presets, line types, basic line properties, size, rotation, position, gradient and color types, line dash types, 3D rotation presets, and text transform presets. As illustrated in the formatting property examples 320A, the formatting property "fill types" may include color, gradient, pattern, etc. For example, the fill type of content within an application may include sub-categories of formatting properties and/or formatting information associated with the fill type of the content such as a color of the fill, whether the content fill includes a pattern (e.g., including the color of the pattern, transparency, etc.), whether the content fill includes a gradient, and the like. In another example, the formatting property "fill presets" may include fill options associated with the fill types such as a type of gradient (e.g. light), a type of texture (e.g., papyrus), a type of a pattern (e.g., zig zag), etc. In yet another example, the formatting property "effect type" may include reflection, shadow, glow, etc. In yet another example, the formatting property "basic line properties" may include color, shadow, glow, etc.

In other examples, the formatting property "size" may include height, width, etc. In another example, the formatting property "rotation" may include degrees of rotation. In yet another example, the formatting property "position" may include horizontal position, vertical position, etc. In yet another example, the formatting property "gradient and color types" may include linear gradient, radial gradient, and color of gradient stops. In yet another example, the formatting property "line dash types" may include solid, round dot, square dot, etc. In yet another example, the formatting property "3D rotation presets" may include isometric left down, perspective left, etc. In yet another example, the formatting property "text transform presets" may include arch up, arch down, fade left, etc. In yet another example, the formatting property "effect presets" may include offset bottom shadow, half reflection, etc. In yet another example, the formatting property "line type" may include no line, solid line, gradient line, etc.

Referring now to FIG. 3B, a table 300B of exemplary formatting properties is illustrated. The table 300B includes formatting properties 310B and formatting property examples 320B (e.g., sub-categories and/or formatting information of formatting properties 310B). The formatting properties 310B include gradient directions, picture and texture fill properties, detailed line properties, detailed effect properties, custom 3D rotation properties, detailed size properties, advanced gradient properties, advanced line properties, and advanced bevel properties. As illustrated in the formatting property examples 320B, the formatting property "gradient directions" may include linear diagonal—top left to bottom right, from center, etc. For example, the gradient directions of content within an application may include sub-categories of formatting properties and/or formatting information associated with the gradient directions of the content such as the direction of the gradient. In another example, the formatting property "picture and texture fill" may include transparency, offset, etc. In yet another example, the formatting property "detailed line" may include transparency, compound type, etc. In yet another example, the formatting property "detailed effect" may include color, transparency, size, blur, bevel material, etc.

In other examples, the formatting property "custom 3D rotation" may include X rotation and Y rotation. In another example, the formatting property "detailed size" may include scale height, locked aspect ratio, resolution, etc. In yet another example, the formatting property "advanced gradient" may include angle, # gradient stops, position of gradient stops, etc. In yet another example, the formatting property "advanced line" may include cap type, joint type, arrow size, etc. In yet another example, the formatting property "advanced bevel" may include lighting angle.

It is appreciated that while FIGS. 3A and 3B illustrate formatting properties 310A and 310B and formatting property examples 320A and 320B, the discussion of formatting properties 310A and 310B and formatting property examples 320A and 320B is exemplary only and should not be considered as limiting. Any suitable number and/or type of formatting properties 310A and 310B and formatting property examples 320A and 320B may be utilized to facilitate consumption and/or authoring of content for users with visual (e.g., vision) impairments.

Figure 4:
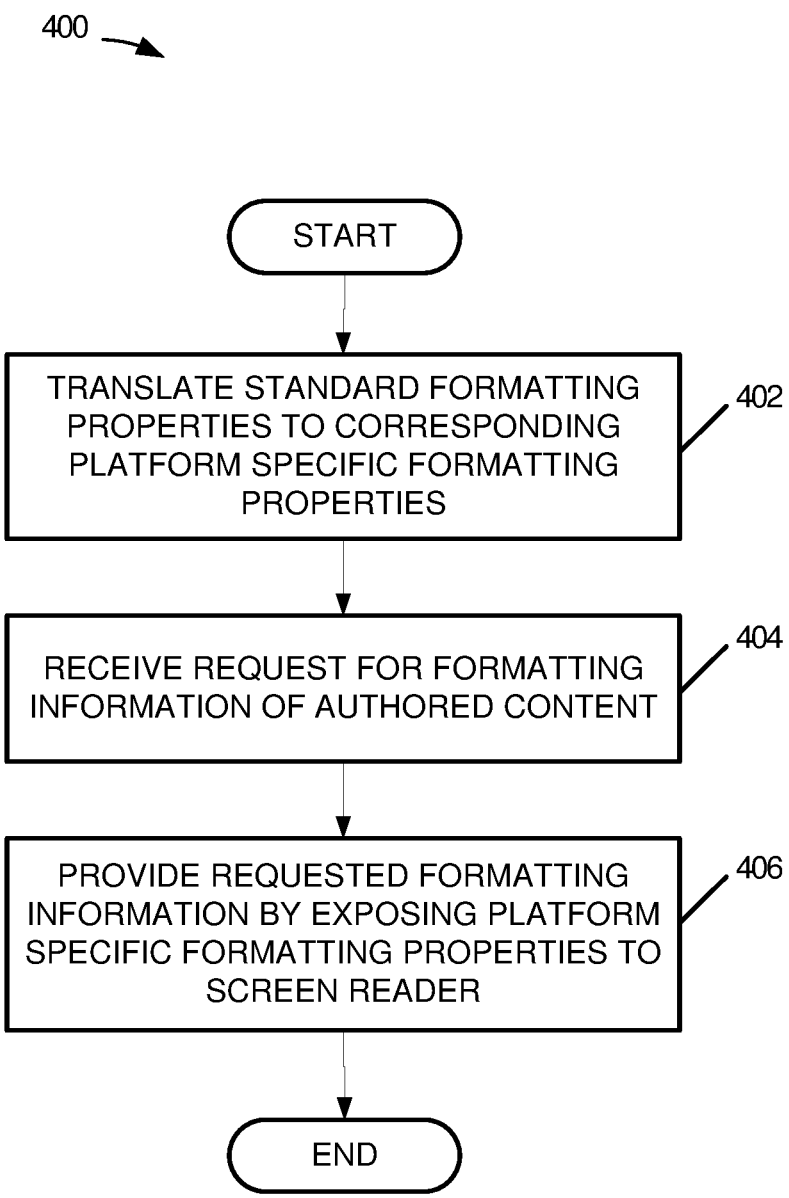
FIG. 4 illustrates an exemplary method providing access to formatting information of authored content within an application, according to an example aspect.

Further aspects described herein include receiving a request for formatting information of at least some of the authored content within the application. Referring now to FIG. 4, an exemplary method 400 for providing access to formatting information of authored content within an application, according to an example aspect is shown. Method 400 may be implemented on a computing device or a similar electronic device capable of executing instructions through at least one processor. The content may be displayed by any suitable software application. For example, the software application may be one of an email application, a social networking application, project management application, a collaboration application, an enterprise management application, a messaging application, a word processing application, a spreadsheet application, a database application, a presentation application, a contacts application, a calendaring application, etc. This list is exemplary only and should not be considered as limiting. Any suitable application for displaying the content and exposing formatting properties may be utilized by method 400.

Method 400 may begin at operation 502, where one or more of a plurality of standard formatting properties of the authored content within the application is translated to one or more corresponding platform specific formatting properties. For example, the plurality of standard formatting properties of the authored content within the application may be accessible across all computing platforms (e.g., all operating systems running on any type of hardware). The one or more corresponding platform specific formatting properties may be formatting properties populated in an associated computing platform (e.g., the computing platform on which the application is running) As such, a screen reader may have access to the plurality of formatting properties of content associated with an application regardless of what platform the application is running on. In one example, the standard formatting properties comprise at least one of fill types, fill presets, effect types, effect presets, line types, basic line properties, size, rotation, position, gradient and color types, line dash types, 3D rotation presets, text transform presets, gradient directions, picture and texture fill properties, detailed line properties, detailed effect properties, custom 3D rotation properties, detailed size properties, advanced gradient properties, advanced line properties, and advanced bevel properties.

When one or more of a plurality of standard formatting properties of the authored content within the application is translated to one or more corresponding platform specific formatting properties, flow proceeds to operation 404 where a request for formatting information of at least some of the authored content within the application is received. For example, a user with visual impairments may use a screen reader to consume content previously authored within an application. In this case, the user may request formatting information of some of and/or all of the content within a file, for example In another example, a user with visual impairments may use a screen reader as they are authoring content within an application. For example, as a user with visual impairments is creating content (e.g., text, objects, graphs, tables, and the like), the user may request formatting information such as layout information so that they know where within a file, for example, the content is located and/or where the content is located relative to other content within the file. In some cases, the formatting information may be associated with the one or more corresponding platform specific formatting properties. For example, a platform specific formatting property may include a fill type. The formatting information associated with the fill type formatting property may include a color such as blue, red, pink, yellow, black, etc.

When a request for formatting information of at least some of the authored content within the application is received, flow proceeds to operation 506 where the requested formatting information of at least some of the authored content within the application is provided by exposing the one or more corresponding platform specific formatting properties to a screen reader. For example, as a user consumes and/or authors content within an application, the user may use the screen reader with the content to "listen" to the formatting information associated with the content. The platform specific formatting properties associated with the content are exposed such that they are available for a screen reader to read. In this regard, a person with vision impairments can view content within an application clearly and accurately and have the same experience that a person without vision impairments can have while viewing and/or authoring content within a file and/or application.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes application 506, which is representative of the applications discussed with respect to the preceding FIGS. 1-4, including word processing applications described herein. When executed by processing system 502 to enhance content accessibility, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced content accessibility technology.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include application 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced image correction to compensate for visual impairments. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising one or more computer readable storage media; and program instructions stored on the one or more computer readable storage media that, when executed by at least one processor, cause the at least one processor to at least: generate a hierarchical structure of a plurality of standard formatting properties of content associated with an application; translate one or more of the plurality of standard formatting properties to one or more corresponding platform specific formatting properties; and expose the one or more corresponding platform specific formatting properties in the hierarchical structure for access by a screen reader. In further examples, the application includes at least one of a word processing application, a spreadsheet application, and an electronic slide presentation application. In further examples, the content comprises content authored by a user of the application. In further examples, the hierarchical structure of the plurality of standard formatting properties comprises sub-categories of the plurality of standard formatting properties, and wherein the sub-categories of the plurality of standard formatting properties include formatting information. In further examples, the plurality of standard formatting properties includes formatting information. In further examples, the standard formatting properties comprise at least one of fill types, fill presets, effect types, effect presets, line types, basic line properties, size, rotation, and position. In further examples, the standard formatting properties comprise at least one of gradient and color types, line dash types, 3D rotation presets, text transform presets, gradient directions, picture and texture fill properties, detailed line properties, detailed effect properties, custom 3D rotation properties, detailed size properties, advanced gradient properties, advanced line properties, and advanced bevel properties. In further examples, to translate one or more of the plurality of standard formatting properties to one or more corresponding platform specific formatting properties, the program instructions, when executed by the at least one processor, further cause the at least one processor to determine whether the one or more corresponding platform specific formatting properties are populated in an associated computing platform. In further examples, to expose the one or more corresponding platform specific formatting properties in the hierarchical structure for access by a screen reader, the program instructions, when executed by the at least one processor, further cause the at least one processor to provide formatting information of the content associated with the application.

Further aspects disclosed herein provide an exemplary computer-implemented method for providing access to formatting information of authored content within an application, the method comprising: translating one or more of a plurality of standard formatting properties of the authored content within the application to one or more corresponding platform specific formatting properties; receiving a request for formatting information of at least some of the authored content within the application, the formatting information associated with the one or more corresponding platform specific formatting properties; and providing the requested formatting information of at least some of the authored content within the application by exposing the one or more corresponding platform specific formatting properties to a screen reader. In further examples, the computer-implemented method further comprises receiving an input for authoring additional content within the application. In further examples, the computer-implemented method further comprises receiving a request for formatting information of the additional authored content, the formatting information associated with the one or more corresponding platform specific formatting properties. In further examples, the computer-implemented method further comprises providing the requested formatting information of the additional authored content by exposing the one or more corresponding platform specific formatting properties to the screen reader. In further examples, translating one or more of the plurality of standard formatting properties of the authored content within the application to one or more corresponding platform specific formatting properties comprises determining whether the one or more corresponding platform specific formatting properties are populated in an associated computing platform. In further examples, the standard formatting properties comprise at least one of fill types, fill presets, effect types, effect presets, line types, basic line properties, size, rotation, and position. In further examples, the standard formatting properties comprise at least one of gradient and color types, line dash types, 3D rotation presets, text transform presets, gradient directions, picture and texture fill properties, detailed line properties, detailed effect properties, custom 3D rotation properties, detailed size properties, advanced gradient properties, advanced line properties, and advanced bevel properties.

Additional aspects disclosed herein provide exemplary computing apparatus comprising: one or more computer readable storage media; and an application embodied at least in part in program instructions stored on the one or more computer readable storage media and comprising: a file in a user interface through which to present at least one tool for authoring of content; at least one tool through which to, in response to receiving an indication of interest made with respect to the at least one tool, facilitate authoring of content within the file; and authored content within the file in the user interface through which to, in response to receiving a request for formatting information of at least some of the authored content within the file, expose a plurality of formatting properties of the authored content to a screen reader, the plurality of formatting properties including at least layout properties. In further examples, the layout properties indicate a location of the authored content within the file. In further examples, the plurality of formatting properties further comprise fill types, fill presets, effect types, effect presets, line types, basic line properties, size, rotation, and position. In further examples, the application includes at least one of a word processing application, a spreadsheet application, and an electronic slide presentation application.

Techniques for providing access to formatting information of authored content within an application for users with visual (e.g., vision) impairments are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of image correction systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   one or more computer readable storage media; and
   program instructions stored on the one or more computer readable storage media that, when executed by at least one processor, cause the at least one processor to at least:
   generate a hierarchical structure of a plurality of platform agnostic formatting properties of a view of content associated with an application comprising one or more types of formatting properties of the content organized such that each type of the one or more types of formatting properties has sub-categories of formatting properties;
   translate one or more of the plurality of platform agnostic formatting properties to one or more corresponding platform specific formatting properties, where the platform specific formatting properties are formatting properties populated in an associated computing platform on which the application is executed;
   provide a first set of corresponding platform specific formatting properties in the hierarchical structure configured to be visible to a screen reader; and
   in response to receiving a request for additional formatting properties, provide a second set of the corresponding platform specific formatting properties associated with at least one sub-category of the requested additional formatting properties in the hierarchical structure configured to be visible to the screen reader.

2. The system of claim 1, wherein the application includes at least one of a word processing application, a spreadsheet application, and an electronic slide presentation application.

3. The system of claim 1, wherein the content comprises content authored by a user of the application.

4. The system of claim 1, wherein the sub-categories of the plurality of standard formatting properties include formatting information.

5. The system of claim 1, wherein the plurality of standard formatting properties includes formatting information, where the formatting information is information of the content relative to the application.

6. The system of claim 1, wherein the standard formatting properties comprise at least one of fill types, fill presets, effect types, effect presets, line types, line properties, size, rotation, and position.

7. The system of claim 1, wherein the standard formatting properties comprise at least one of gradient and color types, line dash types, 3D rotation presets, text transform presets, gradient directions, picture and texture fill properties, detailed line properties, detailed effect properties, 3D rotation properties, detailed size properties, gradient properties, line properties, and bevel properties.

8. The system of claim 1, wherein to translate one or more of the plurality of standard formatting properties to one or more corresponding platform specific formatting properties, the program instructions, when executed by the at least one processor, further cause the at least one processor to determine whether the one or more corresponding platform specific formatting properties are populated in an associated computing platform.

9. The system of claim 1, wherein to cause the one or more corresponding platform specific formatting properties in the hierarchical structure to be visible to a screen reader, the program instructions, when executed by the at least one processor, further cause the at least one processor to provide formatting information of the content associated with the application.

10. A computer-implemented method for providing access to formatting information of authored content within an application, the method comprising:
- translating one or more of a plurality of standard formatting properties of the authored content within the application to one or more corresponding platform specific formatting properties, where the platform specific formatting properties are formatting properties populated in an associated computing platform on which the application is executed;
- receiving a first request for a first set of formatting information of at least some of the authored content within the application, the first set of formatting information associated with a first sub-category of the one or more corresponding platform specific formatting properties;
- providing the requested first set of formatting information of at least some of the authored content within the application by causing the first sub-category of the one or more corresponding platform specific formatting properties to be visible to a screen reader;
- receiving a second request for a second set of formatting information of at least some of the authored content within the application, the second set of formatting information associated with a second sub-category of the one or more corresponding platform specific formatting properties; and
- providing the requested second set of formatting information of at least some of the authored content within the application by causing the second sub-category of the one or more corresponding platform specific formatting properties to be visible to the screen reader.

11. The computer-implemented method of claim 10, further comprising receiving an input for authoring additional content within the application.

12. The computer-implemented method of claim 11, further comprising receiving a request for formatting information of the additional authored content, the formatting information associated with the one or more corresponding platform specific formatting properties.

13. The computer-implemented method of claim 12, further comprising providing the requested formatting information of the additional authored content by causing the one or more corresponding platform specific formatting properties to be visible to the screen reader.

14. The computer-implemented method of claim 10, wherein translating one or more of the plurality of standard formatting properties of the authored content within the application to one or more corresponding platform specific formatting properties comprises determining whether the one or more corresponding platform specific formatting properties are populated in an associated computing platform.

15. The computer-implemented method of claim 10, wherein the standard formatting properties comprise at least one of fill types, fill presets, effect types, effect presets, line types, line properties, size, rotation, and position.

16. The computer-implemented method of claim 10, wherein the standard formatting properties comprise at least one of gradient and color types, line dash types, 3D rotation presets, text transform presets, gradient directions, picture and texture fill properties, detailed line properties, detailed effect properties, custom 3D rotation properties, detailed size properties, gradient properties, line properties, and bevel properties.

17. A computing apparatus comprising:
- one or more computer readable storage media; and
- an application embodied at least in part in program instructions stored on the one or more computer readable storage media and comprising:
- a file in a user interface through which to present at least one tool for authoring of content;
- at least one tool through which to, in response to receiving an indication of interest made with respect to the at least one tool, facilitate authoring of content within the file; and
- authored content within the file in the user interface through which to, in response to receiving a first request for a first set of formatting information of at least some of the authored content within the file, cause a first sub-category of a plurality of formatting properties of the authored content to be visible to a screen reader, the plurality of formatting properties including at least layout properties, and in response to receiving a second request for a second set of formatting information of at least some of the authored content within the file, cause a second sub-category of the plurality of formatting properties of the authored content to be visible to the screen reader.

18. The computing apparatus of claim 17, wherein the layout properties indicate a location of the authored content within the file.

19. The computing apparatus of claim 17, wherein the plurality of formatting properties further comprise fill types, fill presets, effect types, effect presets, line types, line properties, size, rotation, and position.

20. The computing apparatus of claim 17, wherein the application includes at least one of a word processing application, a spreadsheet application, and an electronic slide presentation application.

* * * * *